July 4, 1939.  J. W. BERWICK  2,164,378
LIGHTING DEVICE
Filed March 24, 1937  3 Sheets-Sheet 1
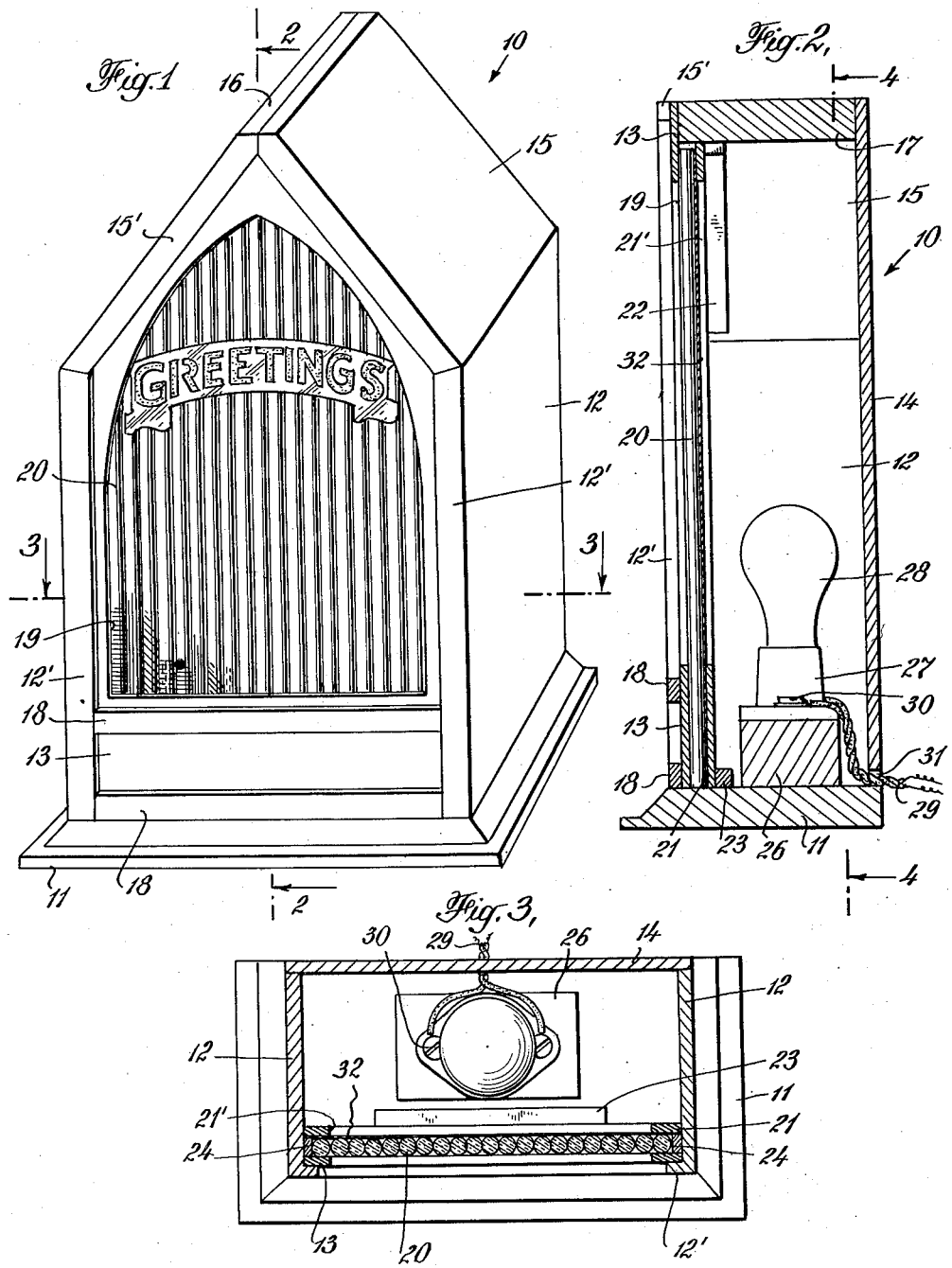
INVENTOR
Jay W. Berwick
BY
Pennie Davis Marvin & Edmonds
ATTORNEYS July 4, 1939.    J. W. BERWICK    2,164,378
LIGHTING DEVICE
Filed March 24, 1937    3 Sheets-Sheet 2
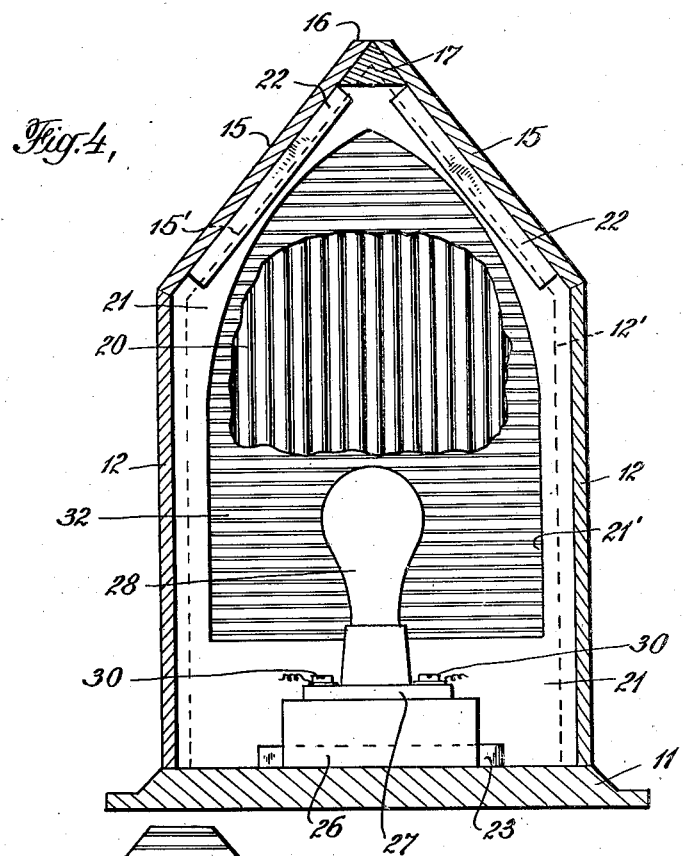
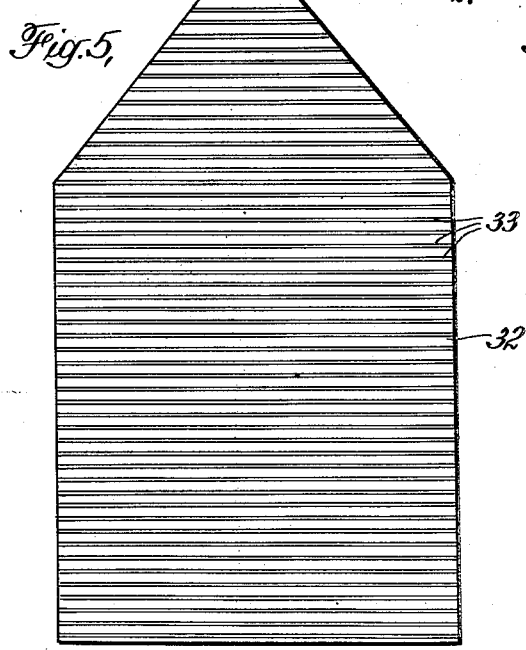
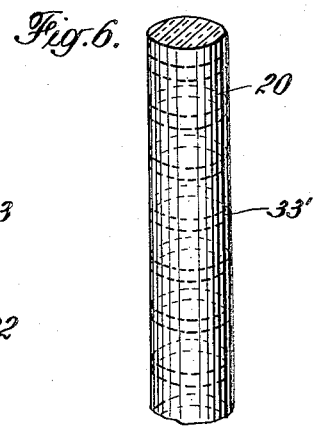
INVENTOR
Jay W. Berwick
BY
Pennie Davis Marvin & Edmonds
ATTORNEYS July 4, 1939.  J. W. BERWICK  2,164,378
LIGHTING DEVICE
Filed March 24, 1937  3 Sheets-Sheet 3
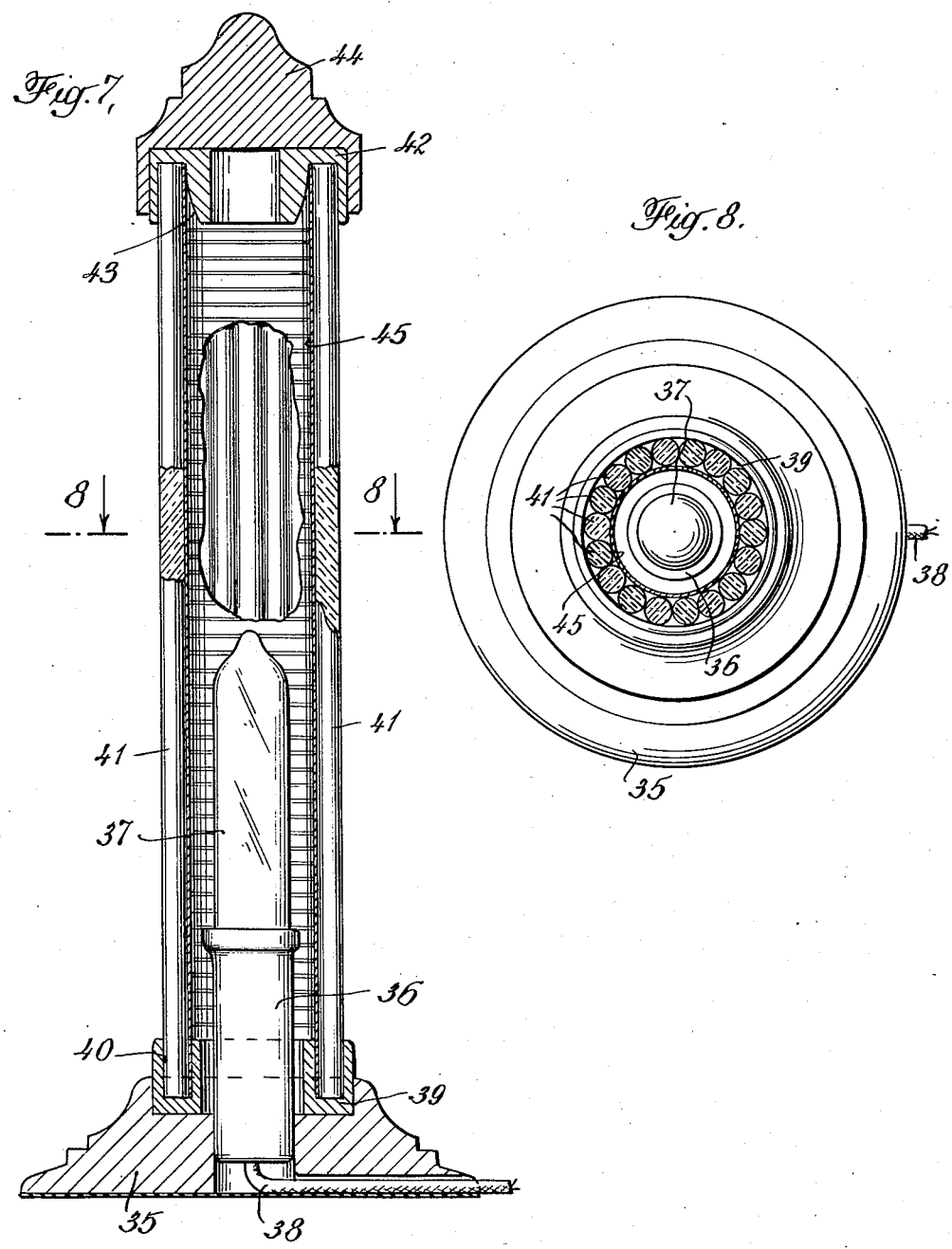
INVENTOR
Jay W. Berwick
BY
Pennie Davis Marvin & Edmonds
ATTORNEYS Patented July 4, 1939

2,164,378

UNITED STATES PATENT OFFICE 2,164,378

LIGHTING DEVICE

Jay W. Berwick, Woodcliff, N. J., assignor to Raylite Trading Company, a corporation of New York Application March 24, 1937, Serial No. 132,703

7 Claims. (Cl. 240—10)

This invention relates to illuminating devices and has particular reference to a novel device of this character which emits a light similar to that of a gas-discharge glow tube, such as a neon tube or the like. The new device is of a simple construction adapted for manufacture at low cost and may be operated by an ordinary electric light bulb.

An illuminating device made in accordance with the present invention comprises a light source, such as a filament bulb or the like, mounted on a suitable base. The light source is arranged behind a solid rod or a plurality of rods, preferably of glass, each of which is translucent. In the preferred form of the new lighting device, I provide a nest of translucent rods arranged vertically in closely adjacent relation so as to prevent the passage of light between them. The nest of rods may take any desired form. For example, the rods may be arranged in alignment to form a straight wall, or they may be arranged in circular series to form a circular wall extending around the light source. The rods are preferably colored either by means of a suitable translucent coating applied thereto or by means of coloring matter in the glass or other material from which the rods are made.

Between the light source and the rod or rods, I prefer to interpose means for diffusing the light from the light source. Various means may be used for this purpose, but I have found that very desirable results may be obtained by employing a translucent sheet of fabric provided with narrow areas of varying degrees of translucency extending transversely with respect to the glass rods. Preferably, the diffusing means is mounted between the light source and glass rods substantially in contact with the rods and is arranged so that it is maintained in a smooth condition at all times.

With this construction, the light emitted from the bulb or other light source impinges upon the rod or rods mounted in front of the light source. The rods, being translucent, permit the light to pass therethrough so that when the rods are viewed from the front they give the appearance of being self-illuminated, as in a gas-discharge tube. The diffusing means between the light source and glass rods serves to reduce the intensity of the light and to spread the light uniformly over the glass rods, whereby the light passing through the rods gives a soft uniform glow. By employing diffusing means having narrow transverse sections of different translucency, the light transmitted through the diffusing means is broken up into transverse sections or lines of varying light intensity. These lines are optically adopted by the rods as the light passes therethrough so as to simulate rings extending entirely around the rods, whereby the depth or third dimension of the rods is accentuated. Accordingly, when the device is illuminated the glass rods bear a substantial likeness to neon or other gas-discharge tubes, depending on their color.

For a better understanding of the invention reference may be had to the accompanying drawings in which:

Fig. 1 is a view in perspective of one form of the new illuminating device;

Figs. 2 and 3 are sections on the lines 2—2 and 3—3, respectively, in Fig. 1;

Fig. 4 is a section on the line 4—4 in Fig. 2;

Fig. 5 is a front view of one form of the light diffusing means;

Fig. 6 is an enlarged front view of a portion of one of the rods as it appears in perspective when light is passed therethrough from the diffusing screen shown in Fig. 5.

Fig. 7 is a vertical section through another form of the new lighting device; and Fig. 8 is a section on the line 8—8 of Fig. 7.

For the purpose of illustration, I have shown in the drawings two embodiments of the new invention for use as ornamental display devices. It is to be understood, however, that the invention is not limited to this use but may be used for other purposes as well.

Referring to the drawings, the numeral 10 designates a casing comprising a base 11, side walls 12 and front and rear walls 13 and 14, respectively. The walls may be made of wood or the like and are secured on the base in any suitable manner, not shown. The side walls 12 are surmounted by roof members 15 which extend upwardly and inwardly from the tops of the side walls and meet at their upper ends to form a flat ridge 16. A ridge member 17 (Figs. 2 and 4) fits against the inside of the roof members 15 beneath the ridge 16 where it is glued to the roof members or otherwise secured thereto. The side walls 12 and roof members 15 are provided along their front edges with flanges 12' and 15', respectively, which extend inwardly over the edges of the front wall 13. The upper portion of the front wall 13 is in the form of a gable, the peak of which is held between the front end of the ridge member 17 and the flanges 15' on the roof members. The wall 13 is disposed between the side walls and roof members and rests against the inside of the flanges 12' and 15' with its edges in substantially contacting relation with the side walls and roof members. A pair of spaced cross members 18 extend across the lower face of the front wall 13 and are connected at their opposite ends to the flange 12'. Above the cross members 18, the front wall 13 is provided with an opening 19 having a flat lower edge, the sides of the opening extending upwardly in a straight line and then converging to a peak near the top of the gable portion of the front wall, as shown in Fig. 1.

In back of the front wall 13 of the casing is a row of translucent rods 20, preferably of glass. The rods 20 are arranged vertically in adjacent contacting relation so as to completely cover the opening 19 in the front wall. Beginning with the rods near the sides of the casing, the rods are of progressively greater length, those near the middle of the opening 19 being the longest. The rods rest on the base 10 with their upper ends substantially in engagement with the roof members 15 and are held against the front wall 13 over the opening therein by a frame 21 of the same general dimensions as the front wall 13. The frame 21 has an opening 21' aligned with the opening 19 in the front wall and of the same shape and size as the latter opening. A strip of wood 22 is secured to the inner surface of each roof member 15 in back of the frame 21 and a similar strip 23 is mounted on the base 10 in back of the frame to hold the latter in position in the casing. Preferably, a wedge 24 is interposed between the rod 20 at each end of the row of rods and the adjacent side wall 12, whereby the rods are maintained at all times in contacting relation.

Mounted on the base 10 behind the translucent rods is a block 26 which supports an electric light socket 27. The socket has a lamp 28 screwed therein and is supplied with current by two wires 29 which are connected to binding posts 30 on the socket. The wires 29 extend through an opening 31 in the rear wall 14 and are connected to a current source, not shown. The lamp 28 may be of any suitable type, but is preferably a common tungsten filament lamp.

Between the lamp 28 and the rods 20, I prefer to interpose suitable means for diffusing the light from the lamp, and to this end I provide a sheet 32 of fabric or the like which is held between the rods and the frame 21 and therefore engages the back of the rods. In the preferred form of the diffusing means (Fig. 5) the sheet 32 is made of water-marked paper, either linen or bond, and is arranged so that the water-marks 33 extend horizontally, that is, transversely of the rods 20. The sheet 32 is of the same size as the frame 21 and is held thereby in a smooth condition against the rods 20 at all times.

With this construction, when the lamp 28 is energized the light therefrom passes first through the diffusing sheet 32 and from the latter through the translucent rods 20. Accordingly, when the rods are viewed from in front of the casing, they appear to emanate a soft glow similar to that of a plurality of gas-discharge glow tubes. The light in passing through the diffusing sheet 32 is broken up into transverse bands of light of alternately greater and less intensity, the water-marks 33 permitting the passage of more light than the remaining portions of the sheet and therefore transmitting the bands of greater light intensity. The bands of light of greater intensity in passing through the rods 20 are optically adopted by the rods so that the bands appear as spaced rings 33' (Fig. 6) extending completely around each rod, the rings being of lighter shade than the intermediate portions of the rod. The rings 33' thus bring out more clearly the depth or third dimension of the rods when viewed from in front of the casing 10.

While the rods 20 may be made of any suitable material, provided they are translucent, I have found that a desirable lighting effect may be obtained by employing rods of various colors. The rods are preferably made of colored glass, although if desired they may be colored by applying a suitable translucent coating thereto. The rods when colored appear to be self-illuminated and emit a glow of a shade corresponding to the respective colors of the rods. Thus, a rod having a red color simulates a neon discharge tube, and one having a violet color simulates a mercury discharge tube, etc. If desired, a sign 35 made of paper or other translucent material may be mounted over the front of the tubes 20 so that light from the tubes will pass through the sign and illuminate the letters thereof. It will be observed that by removing the rear wall 14 from the casing and detaching the strips of wood 22 and 23, the frame 21 and the light diffusing sheet may be removed from the casing, whereby the rods 20 may be replaced by rods of different form or color.

The illuminating device shown in Figs. 7 and 8 of the drawings comprises a base 35 having a central bore in which a lamp socket 36 is mounted. The socket 36 extends upwardly from the base and has a substantially cylindrical lamp 37 screwed in its upper end, the lamp and socket being of relatively small diameter. A wire 38 leads from the socket through the bottom of the base 35 to a suitable current source for supplying the lamp.

The upper surface of the base 35 is recessed to receive an annulus 39 which surrounds the lamp socket 36. A groove 40 is formed in the top of the annulus 39 and extends completely around the annulus. Seated on the bottom of the groove 40 are a plurality of solid translucent rods 41, preferably of colored glass, the rods being arranged in closely contacting relation in a circular series (Fig. 8). The rods extend upwardly from the annulus 39 and are held together at their upper ends by another annulus 42. A groove 43 extends around the annulus 42 in the bottom thereof, and the upper ends of the rods are disposed in the groove 43 in contact with the base of the groove. The annulus 42 may be surmounted by a cap 44 of any desired form, the cap being recessed to fit over the top of the annulus.

A sheet of light diffusing material 45 is preferably interposed between the light source 37 and the rods 41. The sheet 45 may be of water marked paper similar to the sheet 32 shown in Fig. 5 and is arranged to completely surround the lamp 37, the water marks extending transversely of the rods. In order to secure the sheet 45 in position, I prefer to mount it within the circular series of rods 41 in engagement therewith so that the ends of the sheet are held in the grooves 40 and 43.

It will be apparent that the light from the lamp 37 passing through the sheet 45 and rods 41 will be diffused so as to give a soft, uniform glow. Accordingly, the rods 41 when viewed from the outside of the structure simulate a plurality of self-illuminated gas-discharge tubes. The structure is of a pleasing and attractive form and when illuminated gives the general appearance of a candle. The lamp 37 is readily accessible by removing the annulus 39 bodily from the recess in the base and drawing the annulus and rods 41 over the top of the lamp.

While I have specifically described and illustrated only two forms of the new invention, it will be understood that the invention is not limited thereto but is susceptible to various modifications within its scope. For example, a single rod may be employed in place of the row of rods 20 and the single rod may be bent into any desired configuration.

I claim:

1. An illuminating device comprising a source of light, a solid rod disposed in front of the light source, said rod being translucent to permit the passage of light therethrough from the light source, and light diffusing means interposed between the rod and light source for breaking up the light from said source into bands of varying light intensity extending at substantially right angles to the length of said rod.

2. An illuminating device comprising a source of light, a solid rod disposed in front of the light source, said rod being translucent to permit the passage of light therethrough from the light source, and light diffusing means interposed between the rod and light source including a translucent member having bands of alternately greater and less translucency extending at substantially right angles to the rod.

3. An illuminating device comprising a source of light, a solid rod disposed in front of the light source, said rod being translucent to permit the passage of light therethrough from the light source, and a translucent member interposed between the rod and light source in contacting relation with the back of the rod, said member being operable to diffuse light passing through it from said source into bands of varying light intensity extending at substantially right angles to the length of said rod.

4. An illuminating device comprising a source of light, a glass rod disposed in front of the light source, said rod being translucent to permit the passage of light therethrough from the light source, and a sheet of water-marked paper interposed between the rod and light source with the water-marks extending transversely of the rod.

5. An illuminating device comprising a casing having an opening in one wall thereof, a light source in the casing, a nest of solid rods mounted in said opening to completely cover the same and arranged vertically in aligned, contacting relation, said rods being translucent to permit the passage of light therethrough from the light source, and light diffusing means mounted in the casing between the rods and light source and operable to diffuse light extending through it from said source into bands of varying light intensity extending at substantially right angles to the length of said rods.

6. An illuminating device comprising a plurality of solid translucent rods arranged vertically in circular series, a light source disposed within the circular series of rods, and light diffusing means interposed between the rods and said light source and operable to diffuse light passing through it from said source into bands of varying light intensity extending at substantially right angles to the length of said rods.

7. An illuminating device comprising a plurality of solid translucent rods arranged in circular series, a light source disposed within the circular series of rods, and light diffusing means interposed between the rods and the light source for breaking up the light from said source into bands of varying light intensity extending substantially at right angles to the rods.

JAY W. BERWICK.